United States Patent [19]

Kondoh et al.

[11] Patent Number: 4,708,463
[45] Date of Patent: Nov. 24, 1987

[54] DEVICE FOR ENLARGING AND PROJECTING MICROFILM IMAGE

[75] Inventors: Masahiko Kondoh; Hiroshi Matsuoka, both of Kanagawa, Japan

[73] Assignee: Fuji Photo Film Co., Ltd., Japan

[21] Appl. No.: 947,694

[22] Filed: Dec. 30, 1986

[30] Foreign Application Priority Data

Jan. 21, 1986 [JP] Japan .................................. 61-10784

[51] Int. Cl.$^4$ ............................................. G03B 13/28
[52] U.S. Cl. ....................................... 355/45; 355/55; 350/622
[58] Field of Search ....................... 355/45, 57, 60, 65, 355/66, 55, 52; 350/622

[56] References Cited

U.S. PATENT DOCUMENTS 4,367,033 1/1983 Watanabe ........................ 355/45 X
4,447,147 5/1984 Yamada ............................ 355/57 X

OTHER PUBLICATIONS

Smart, "A Compact Wide Aperture Image Rotator Without Aberrations", Apparatus and Techniques, vol. 13, 1980, pp. 1166-1169.

Primary Examiner—L. T. Hix
Assistant Examiner—Brian W. Brown
Attorney, Agent, or Firm—Laff, Whitesel, Conte & Saret

[57] ABSTRACT

Improvement in the device for enlarging and projecting a microfilm image is provided. The improvement is directed to an optical system acting as a magnification varying means and image rotation means as a united system. The optical system comprises a set of reflectors including three or more odd number of reflectors, magnification varying means for changing the length of the light path through the system thereby to vary the magnification of enlargement, and an image rotation means for rotation said set of reflectors to rotate the light delivering the enlarged image, said magnification varying means and said image rotation means being co-operatively associated with each other such that the light axis of the light getting out of the optical system is aligned with the light incident to the system. In case where the number of reflectors included in the optical system is three, individual reflectors united to constitute the reflector set are moved and/or rotated to vary the magnification of enlargement while satisfying the interrelationship indicated by $\alpha - \beta + \gamma = \pi/2$ where $\alpha$, $\beta$ and $\gamma$ are angles of incident lights on respective reflectors. Also provided by this invention are link assemblies for moving and/or rotating individual reflectors to ensure that they move and/or rotate while always satisfying the interrelation essential for the required performance of the optical system.

8 Claims, 11 Drawing Figures

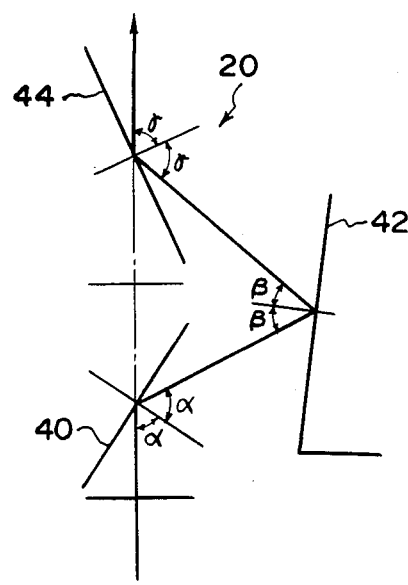
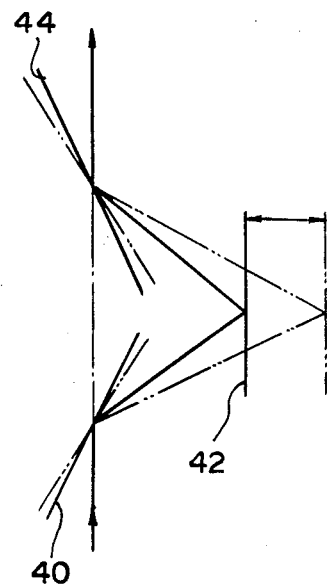
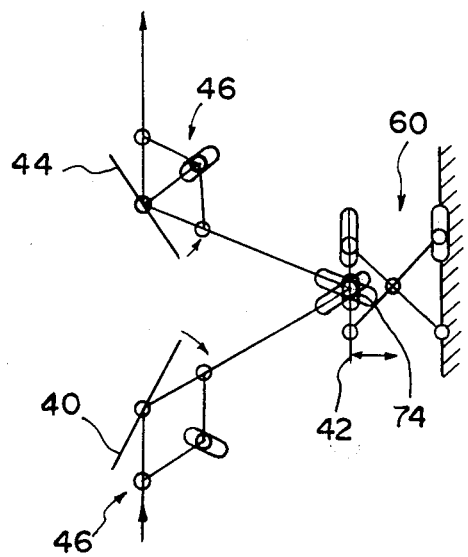

DEVICE FOR ENLARGING AND PROJECTING MICROFILM IMAGE

BACKGROUND OF THE INVENTION

Field of the Invention

The present invention relates generally to a device for enlarging and projecting a microfilm image, which is adapted for use in reader, reader printer, enlarger or enlarged image printer for picking up said microfilm image. More particularluy, it pertains to such a device by which the magnification of enlargement of the image may be changed and the projected and enlarged image may be rotated.

Related Art of the Invention

Various types of reproducers for enlarging an image born by a microfilm, such a image being referred to as microfilm image throughout this specification and appended claims, have hitherto been known in the art. The known devices include a reader for displaying an enlarged microfilm image on a display screen, a reader printer for delivering an enlarged image, which as been once projected on the reader, to a printer to produce a hard copy of the image, and various other types of enlargers and printers for printing enlarged images. In such a device, it becomes frequently necessary that the magnification of enlargement of the image should be varied or the enlarged image should be rotated as required.

For the aforementioned purposes, a magnification varying optical system and an image rotating optical system are individually disposed at separate locations in the light path from the microfilm and the projection lens. In other words, the magnification varying optical lens includes a mirrors or reflectors disposed intermediately of the light path so that they may be moved without changing the angular disposition and the movements thereof are interrelated with the movement of the projection lens. On the other hand, the image rotating optical system is constituted by a triangular prism for receiving a light from one end face, so that the received light is totally reflected inside of the prism at odd occations to go out of the prism through another end face of the prism. The image is rotated by rotating the prism about the optical axis.

However, since the conventional device has a magnification varying optical system and an image rotating optial system individually mounted at different positions, as described above, there are the problems that the device has larger dimensions and the number of parts necessary for assembling the device is increased.

Another disadvantage is that it is impossible to allow the incident light to transmit fully (at a percent transmission of 100%) through both end faces, i.e. the incident face and the face through which the light is emitted, of the prism used for rotation of the image, leading to the detriment that the quality of the enlarged image is degraded.

OBJECTS AND SUMMARY OF THE INVENTION

Accordingly, the present invention resides in a device for enlarging and reproducing a microfilm image to project an enlarged image of good quality.

A more specific object of this invention is to provide such a device which is small in size and constructed of a smaller number of parts.

A further object of this invention is to provide such a device in which the image rotating optical system and the magnification varying optical system are combined together to form a compact and reliable unit.

A further object of this invention is to provide such a device in which rotation of image is performed by a mechanism which does not contain a prism causing reduction of percent transmission of the light passing therethrough.

In the device according to this invention, a light carrying the microfilm image passes through an optical system having three or more odd number of reflectors. The optical system can be rotated about the optical axis of the incident light, and the magnification of enlargement can be changed by moving either one or more of reflectors while retaining the reflectors in a predetermined inter-relation to change the length of the light path.

Particularly, the present invention provides an improved device for enlarging and projecting a microfilm image wherein an image of a microfilm is delivered by a light passing through a projection lens and then through an optical system for rotating said image and for varying the magnification of the enlarged image relative to the original image so that said enlarged image is projected onto a screen or a printer, characterized in that said optical system comprises a set of reflectors, said set of reflectors including three or more odd number of refectors, magnification varying means for changing the length of the ligh path, and image rotation means for rotating said set of reflectors about the incident-and-projection axis.

According to a preferred embodiment of this invention, the number of the reflectors in the system is three and the magnification of enlargement is varied by said maginification varying means such that the interrelationship indicated by $\alpha - \beta + \gamma = \pi/2$ is satisfied where $\alpha$, $\beta$ and $\gamma$ are the angles of the incident lights on respective refectors.

The present invention also includes the provision of link assemblies which are conveniently used in combination with the optical system to rotate and/or move any one or more of the reflectors.

DESCRIPTION OF THE DRAWINGS

FIG. 3 shows the light path in the optical system shown in FIGS. 1 and 2;

FIG. 4 is a view similar to FIG. 3 and shows plural light paths for the understanding of the function of the optical system according to this invention;

FIG. 5 is a simplified view showing diagrammatically the construction of one embodiment of the magnification varying means constructed in accordance with the teaching of this invention;

DETAILED DESCRIPTION OF THE INVENTION

In the device, according to this invention, a light passing through a microfilm and a projection lens is reflected by a set of three or more odd number of reflectors so that the light passes through a bypass in the optical system for varying the magnification of enlargement and for rotating the image. The light going out of the optical system of this invention proceeds along the path which is aligned with the extension of the light path for the incident light. By rotating the set of reflectors about the incident-and-projection axis while keeping the relative positioning of the reflectors at certain fixed positions, the enlarged image is rotated.

On the other hand, when the length of light path is changed by varying the relative positioning of the reflectors under the restriction that the reflectors are kept in certain interrelationship with each other, the magnification of enlargement may be changed. It should be apparent that the projection lens must be moved, or otherwise the focal length thereof is changed, simultaneously with the magnification varying operation to ensure that the enlarged image is focussed on the screen or a photosensitive drum of a printer.

Referring first to FIGS. 1 to 7, a representative embodiment of this invention will be described in detail hereinbelow.

Figure 2:
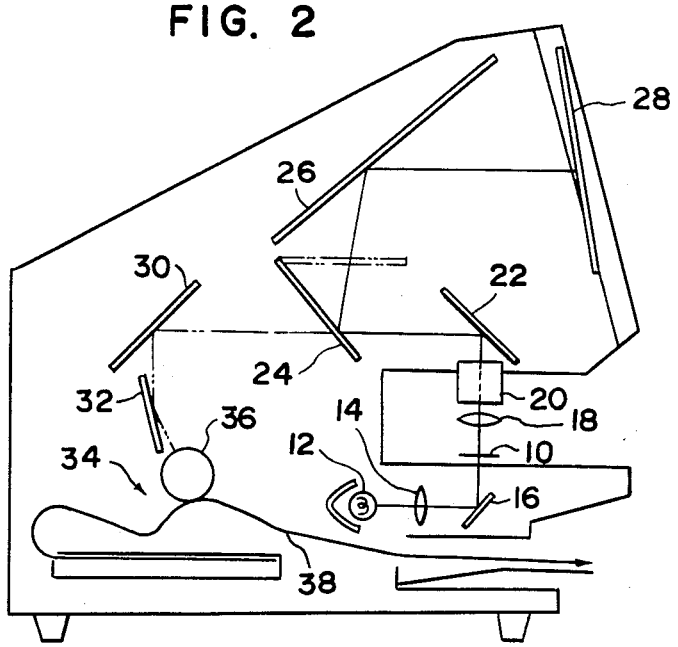
FIG. 2 shows diagrammatically the construction of a reader printer wherein the optical system of FIG. 1 is incorporated.

In FIG. 2, reference numeral 10 designates an original image, such as a photographed image, born on a microfilm or microfiche. A light from a light source 12 is passed through a condenser lens 14 and a reflecting mirror 16 to be led below the underside of the original image 10. The light is passed through a projection lens 18 and an optical system 20 embodying this invention and through the reflecting mirrors 22, 24, 26 onto a screen 28 on which an enlarged image is focussed. The reflecting mirror 24 is swingable, and when it is swung to the phantom line in FIG. 2 the light is reflected by the reflecting mirrors 22,30 and 32 to be led on a photosensitive drum 36 to form a latent image thereon. The latent image may be visualized by a toner, and the thus visualized image is trasferred to a paper sheet 38.

Figure 1:
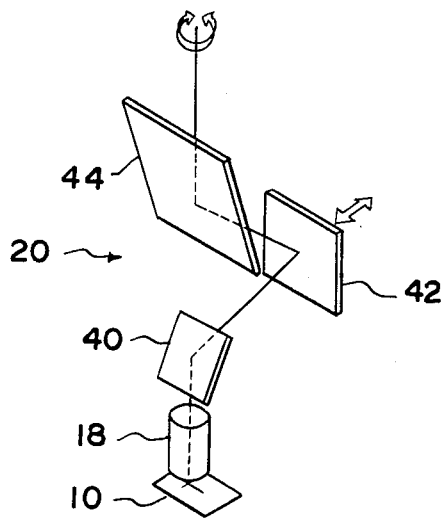
FIG. 1 is a schematic illustration showing the principal construction and operation of an optical system embodying this invention.

The optical system 20 used in this embodiment comprises three reflectors 40, 42 and 44, as shown in FIG. 1. The light incident into the optical system 20 is reflected successively by the mirrors 40, 42 and 44, as shown in FIG. 4, to go out of the system 20 along the path aligned with the extension of the incident light path. As should be understood from FIG. 3, let the incident angles on respective mirrors (the "incident angle" means the angle between the normal line of the reflecting surface of each mirror and the incident light thereon) be $\alpha$, $\beta$ and $\gamma$, these angles are in the interrelation represented by the following equation:

$$\alpha - \beta + \gamma = \pi/2 \tag{1}$$

According to the principle of the present invention, the reflectors 40, 42 and 44 are moved relative to each other in such a manner that the light path for the light incident into the optical system 20 is aligned with the light path for the light going out of the system 20, whereby the length of the light path inside of the optical system 20 is varied. For example, when the reflectors 40, 42 and 44 are rotated or moved to the positions shown by the phantom lines in FIG. 4, the length of the light path inside of the system 20 is changed so that the magnification of enlargement of the image may be varied.

On the other hand, when the reflectors 40, 42 and 44 are rotated while the relative positioning of these reflectors is fixed, as shown in FIG. 1, by 45° about the incident-and projection axis, the enlarged image projected on the screen 28 or the photosensitive drum 36 is rotated by 90°. The optical system 20 may be rotated any suitable means, for example, a manually operable mechanism, stepping motor, servo motor or combination of electromagnetic plunger and link.

The magnification varying means will now be described. According to an important feature of this invention, this means may comprise a link assembly 46 shown in FIG. 6 for rotating the reflectors 40 and 44 in corelated relationship with the linear movement of the reflector 42. In detail, the link assembly 46 of this embodiment comprises a first link 48 fixed to the reflector 40 (or 44) to extend in the direction perpendicular to the reflecting surface and having an elongated slot 48a extending along the longitudinal axis thereof, a second link 50 fixed to a frame to extend in the direction parallel to the incident light direction, a third swingable link 52 extending in the direction parallel to the light path of the reflected light by reflector 40(44), and a fourth link 54 having one end connected to an intermediate portion of the second link 50 and having the other end provided with a pin slidably received in the elongated slot 48a of the first link 48, and a fifth link 56 having one end connected to an intermediate portion of the third swingable link 52 and having the other end connected to a sliding pin received in the elongated slot 48a of the first link 48. The forth and fifth links 54, 56 have the same length and, together with the opposing portions or extensions of the first and third links 50, 52, form a parallelogrammic pantograph-like structure, the shape of the thus formed parallelogram being changed, i.e. flattened and expanded, correspondingly with the swinging action of the third swingable link 52, whereby the angle of inclination of the reflector 40 (or 44) may be changed as will be described in detail hereinafter. When the third swingable link 52 is swung in response to the linear movement of the reflector 42 by an angel $\theta$, the reflector 40 (or 44) is rotated by an angle $\theta/2$. Accordingly, the light incident on the reflector 40 (or 44) along the direction parallel to the lengthwise direction of the second fixed link 50 and reflected by the reflector 40 (or 44) goes in the direction parallel to the axial direction of the link 52.

The swingable link 52 is provided with an elongated slot 52a extending substantially the half length at the swinging end side thereof, and this slot 52a receives a pin which in turn is connected to the substantial center of one side edge of the reflector 42 so that the swingable link 52 is swung in correlation with the movement of the reflector 42, as aforementioned.

Figure 7:
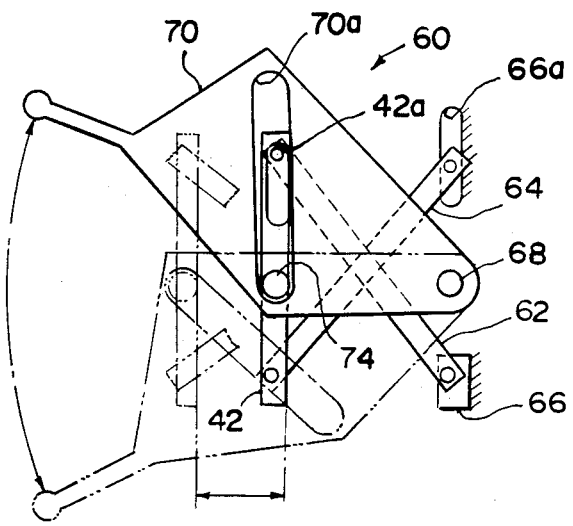
FIG. 7 is a view showing diagrammatically the construction and operation of a link assembly for moving one of the plural reflectors included in the device of this invention.

On the other hand, the reflector 42 may be moved in the direction perpendicular to the incident-and-projection direction which is parallel to the axial direction of the first fixed link 50 without changing its posture or inclination, for example, by means of another link assembly 60 shown in FIG. 7. This link assembly 60 will be referred to as a second link assembly hereinafter and in the appended claims, and comprises two similar link arms 62, 64 having the same length and crossed with each other at the centers thereof. The link arm 62 has one end pivoted to an appropriate position of a frame 66 which is stationaly held in the device, and the other end movably connected through a pin or other suitable member to an elongated slot 42a provided on the side edge of the reflector 42 opposed to the side edge at which the movable third link 52 of the first-mentioned link assembly 46 is connected. The link arm 64 has one end pivoted to the side edge of the reflector 42 and the other end movably connected through a pin or other suitable member to an elongated slot 66a provided in said frame 66. The reflector 42 is moved by a cam plate 70 which may be pivoted about a fulcrum 68. A pin 72 protruding from the side edge of the reflector 42 is received in an elongated slot 70a of the cam plate 70, so that the reflector 42 is moved along a certain linear path without changing its posture or inclination to the incident-and-projecting direction of the light.

Figure 6:
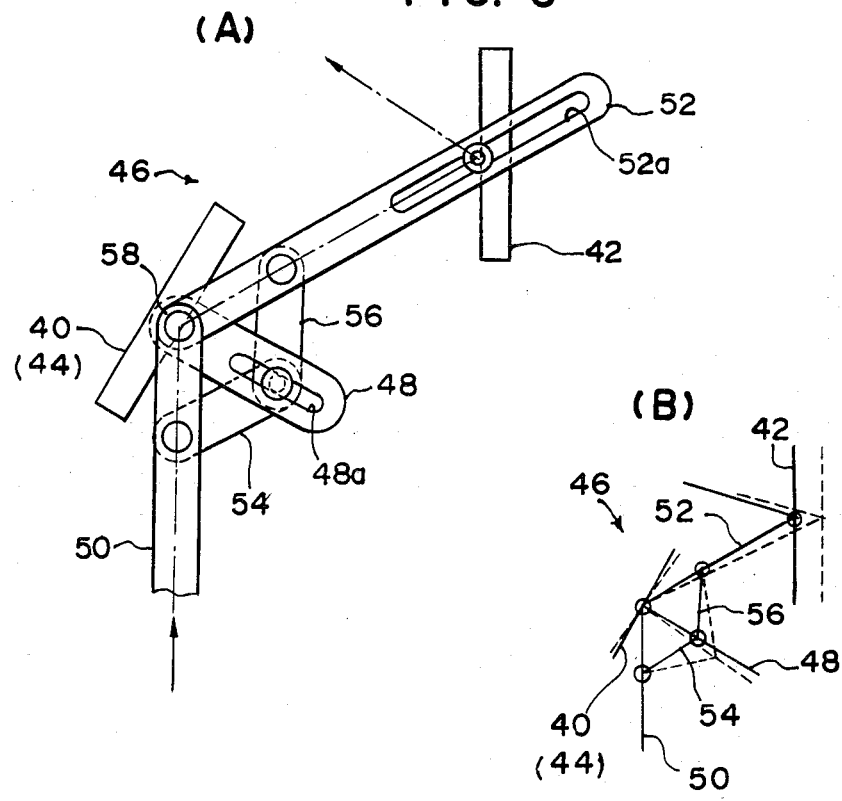
FIG. 6A is a view showing a portion of one embodiment of the link assembly for rotating the image used in the device of this invention.
FIG. 6B is a simplified view showing the operation of the link assembly of FIG. 6A.

Now referring to FIG. 5, the reflectors 40 and 44 are combined respectively with link assemblies 46, one of which is shown in FIG. 6 and has been described in detail hereinbefore. The link assemblies 46, 46 have swingable links 52, 52 (namely the third swingable links in the foregoing description) in which elongated slots 52a, 52a are formed. As shown in FIG. 5, pin protruding from one side edge of the reflector 42 is received both of the elongated slots 52a, 52a of the swingable links 52, 52 of the link assemblies, respectively, coupled with the reflectors 40 and 44. As will be understood from the description in the preceding paragraph, the pin 74 is moved in the direction perpendicular to the reflecting surface of the reflector 42.

As the reflector 42 is moved by the cam plate 70 described with reference to FIG. 7, the swingable links 46, 46 are swung so that the reflectors 40, 44 are rotated by a half angle of the swinging angle of the swingable links 46, 46. As a result, the reflectors 40, 42 and 44 are moved relative to each other while satisfying the interrelation represented by the equation (1). Consequently, the length of the light path inside of the optical system 20 is changed. The projection lens 18 is moved correspondingly to the change in length of the light path while the interrelationship represented by the following equation is satisfied:

$$1/f = 1a + 1b;$$

wherein f is the focal length of the lens 18, a is the distance from the center of the lens 18 to the microfilm image 10, and b is the distance from the center of the lens 18 to the surface of the screen 28 (or the photosensitive drum 36).

Although the magnification varying means incorporated in the aforementioned embodiment includes two link assemblies 46 for rotating the reflectors 40 and 44, another type assemblies may also be used in lieu of the assemblies 46. One example of such link assemblies is shown in FIG. 8 and denoted generally by 46A.

Figure 8:
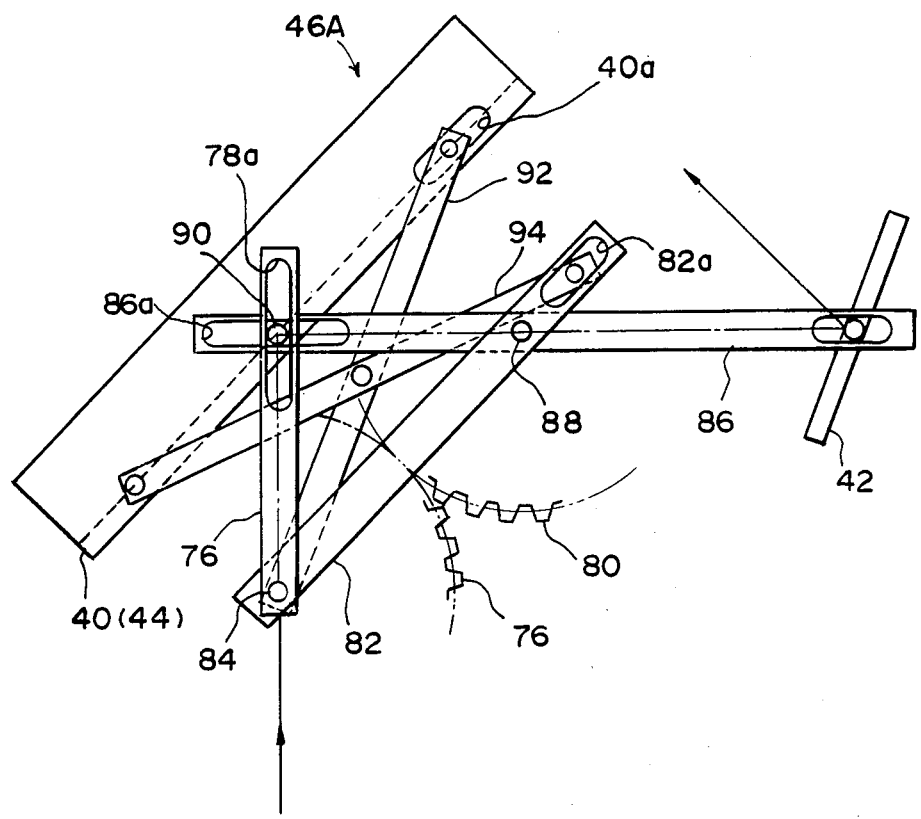
FIG. 8 is a view similar to FIG. 7, showing the construction and operation of a further embodiment of the link assembly.

Referring to FIG. 8, a fixed gear wheel is denoted by 76 and fixed to a frame of the device, and a fixed link 78 is fixedly secured to the gear 76 and extends in the direction parallel to the incident direction of the light. A planetary gear having the same gear number and gear pitch as those of the fixed gear 76 meshes with the gear 76. The bearing shaft 84 for rotation of the fixed gear 76 is connected through a bar link 82 to the planetary gear 80. Another swingable link 86 is fixedly mounted on the bearing shaft 88 of the gear 80 so that it is swung as the gear 80 is rotated. Elongated slots 78a, 78a are provided, respectively, at the end portions of the fixed link 78 and the swingable link 86. The slots 78a, 78a receive pins 90 each having the center axis extending in the plane containing the reflection surface of the reflector 40 (or 44). As will be readily seen by a skilled person from FIG. 8, the reflector 40 (or 44) is moved so that the reflection surface thereof is parallel to the longitudinal axis of the link bar 82 by the coupled link pair 92 and 94. The links 92, 94 crosses at the center portions thereof, and have one ends pivoted to the link 82 and the side edge of the reflector 40 (or 44). A pin protrudes from the other end of the link 92 and received in an elongated slot 40a formed along one side edge of the reflector 40 (or 44). Similarly, a pin protrudes from the other end of the link 94, and is received by an elongated slot 82a provided at the end portion of the link 82. Accordingly, as the swingable link 86 is swung, the pin 90 protruding from the side edge of the reflector 40 (or 44) is moved along the perpendicular bisector of the line from the center of the shaft 84 of the gear 78 and the center of the shaft 88 of the gear 80. At this time, the reflector 40 (or 44) is moved while retaining its reflecting surface parallel to the longitudinal axis of the link bar 82 since the movement thereof is restricted by the coupled link pair 92, 94. As a result, a similar function as obtained by the use of the link assembly 46 of FIG. 6 can be achieved.

Figure 9:
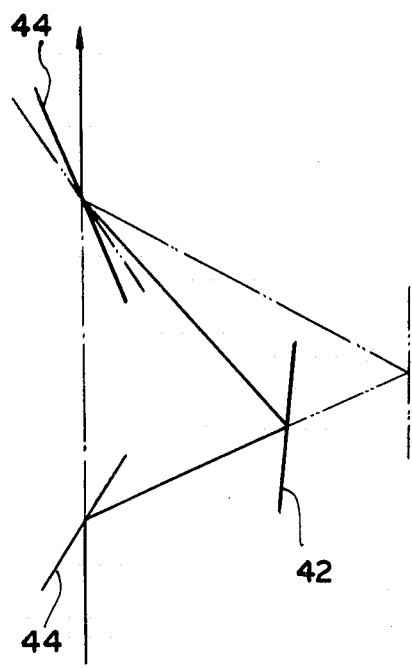
FIGS. 9 and 10 are views, similar to FIG. 4, showing further embodiments of the magnification varying system according to this invention.
Figure 10:
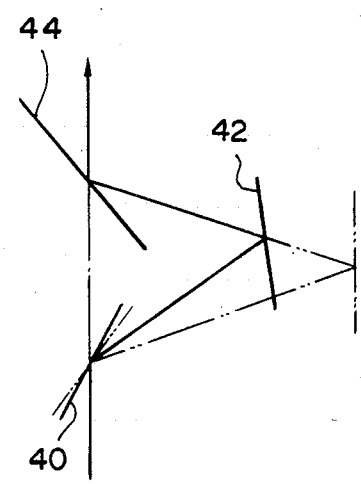

In the aforementioned embodiments, the reflectors 40 and 44 are rotated, as shown in FIG. 4, and the reflector 42 is moved without changing its posture in the magnification varying operation. However, the object of this invention may also be achieved by moving the reflector 42 in the direction perpendicular to the light incident direction while rotating the same, and by rotating either one of the reflectors 40 or 44. Examples of such a construction is shown in FIGS. 9 and 10. In these embodiments, the reflector 42 may be moved by a link assembly similar to the link assembly 60 shown in FIG. 7 except that the link 62 is equilateral to the link 64, in other words, the length of the link 62 is differentiated from that of the link 64.

What is claimed is:

1. An improved device for enlarging and projecting a microfilm image wherein an image of a microfilm is delivered by a light passing through a projection lens and then through an optical system for rotating said image and for varying the magnification of the enlarged image relative to the original image so that said enlarged image is projected onto a screen or a printer, characterized in that said optical system comprises:
    a set of reflectors, said set of reflectors including three or more odd numbers of reflectors;
    magnification varying means for changing the length of the light path; and
    image rotation means for rotating said set of reflectors about the incident-and-projection axis.

2. Th device according to claim 1, wherein said set of reflectors is composed of three reflectors, and wherein said magnification is varied by said magnification varying means such that the interrelationship represented by $\alpha - \beta + \gamma = \pi/2$ is satisfied where $\alpha$, $\beta$ and $\gamma$ are the angles of the incident lights on respective reflectors.

3. The device according to claim 2, wherein said set of reflectors is composed of three reflectors, and wherein said magnification varying means comprises link assemblies operatively associated with respective reflectors and operating to move a second or interposed reflector without changing its posture or inclination relative to the incident-and-projection axis and to rotate the remaining first and third reflectors so that the distances between said interposed reflector and the remaining two reflectors are changed.

4. The device according to claim 3, wherein the first and third reflectors are rotated by the associated link assemblies, and wherein the second reflector is moved relative to said incident-and-projection axis to change the distance thereof to said first and third reflectors without changing its posture or inclination relative to said incident-and-projection direction of the light so that the reflecting surface of said second reflector is not rotated before and after the movement thereof.

5. The device according to claim 2, wherein the second reflector is moved relative to said incident-and-projection direction and simultaneously rotated by the associated link assembly, and wherein either one of the first or third reflectors is rotated by the associated link assembly.

6. The device according to claim 3, wherein said link assemblies are operatively associated to form a composite link assembly unit which comprises:
   a first link fixed to either one of the first and third reflectors to extend in the direction perpendicular to the reflecting surface and having an elongated slot extending along the longitudinal direction thereof;
   a second link fixed to a frame of the device to extend in the direction parallel to the incident light;
   a third swingable link extending in the direction parallel to the light path of the reflected light, and having one end pivoted at the same position to which one end of said first link is pivoted and having the other end provided with an elongated slot for receiving therein a pin protruding from one side edge of said second reflector;
   a fourth link having one end connected to an intermediate portion of said second link and having the other end provided with a pin slidably received in said elongated slot of said first link; and
   a fifth link having one end connected to an intermediate portion of said third swingable link and having one end provided with a sliding pin received in said elongated slot of said first link;
   said fourth and fifth links having the same length and forming, together with the opposing extensions of said first and third links, a parallelogram which is flattened and expanded in response to the swinging action of said third swingable link so that the angle of inclination of the associated reflector is changed in a predetermined correlation with the change in distance between said three reflectors.

7. The device according to claim 6, wherein said second reflector is swung by a second link assembly which comprises two similar link arms having the same length and crossed with each other at the centeres thereof, one of said link arms having one end pivoted to a frame of the device and having the other end movably connected to an elongated slot provided on the side edge of said second reflector, and the other of said link arms having one end pivoted to the side edge of said second reflector and the other end movably connected to an elongated slot provided in said frame of the device, a cam plate having an elongated slot for receiving therein said pin protruding from said side edge of said second reflector, said cam plate being swung at certain angle so that said second reflector is moved along a certain linear path without changing its posture or inclination to said incident-and-projection direction.

8. The device according to claim 3, wherein said link assemblies are operatively associated to form a composite link assembly unit which comprises:
   a fixed gear wheel fixed to a frame of the device;
   a fixed link fixedly secured to said gear and extending in the direction parallel to the incident direction of the light and having one end provided with an elongated slot;
   a planetary gear wheel having the same gear number and gear pitch as those of said fixed gear wheel and meshing with said fixed gear wheel;
   a bar link having one end pivoted to the axis of said fixed gear wheel and having the other end provided with an elongated slot;
   a swingable link pivoted to the bearing shaft of said planetary gear wheel to be swung as said planetary gear wheel is rotated, and having one end provided with elongated slot;
   a pin protruding from one side edge of either one of said first or third reflector and having the center axis extending in the plane containing the reflecting surface of said either one of the first or third reflector, said pin being slidably received in both of said elongated slots formed respectively at said other ends of said fixed link and said swingable link; and
   paired link members crossing with each other at the centers thereof and having ends pivoted to said fixed link and the side edge of the associated reflector, the other end of said paired link members being provided with pins protruding therefrom and received by said elongated slot of said associated reflector and said elongated slot of said bar link.

* * * * *